Figure 1:
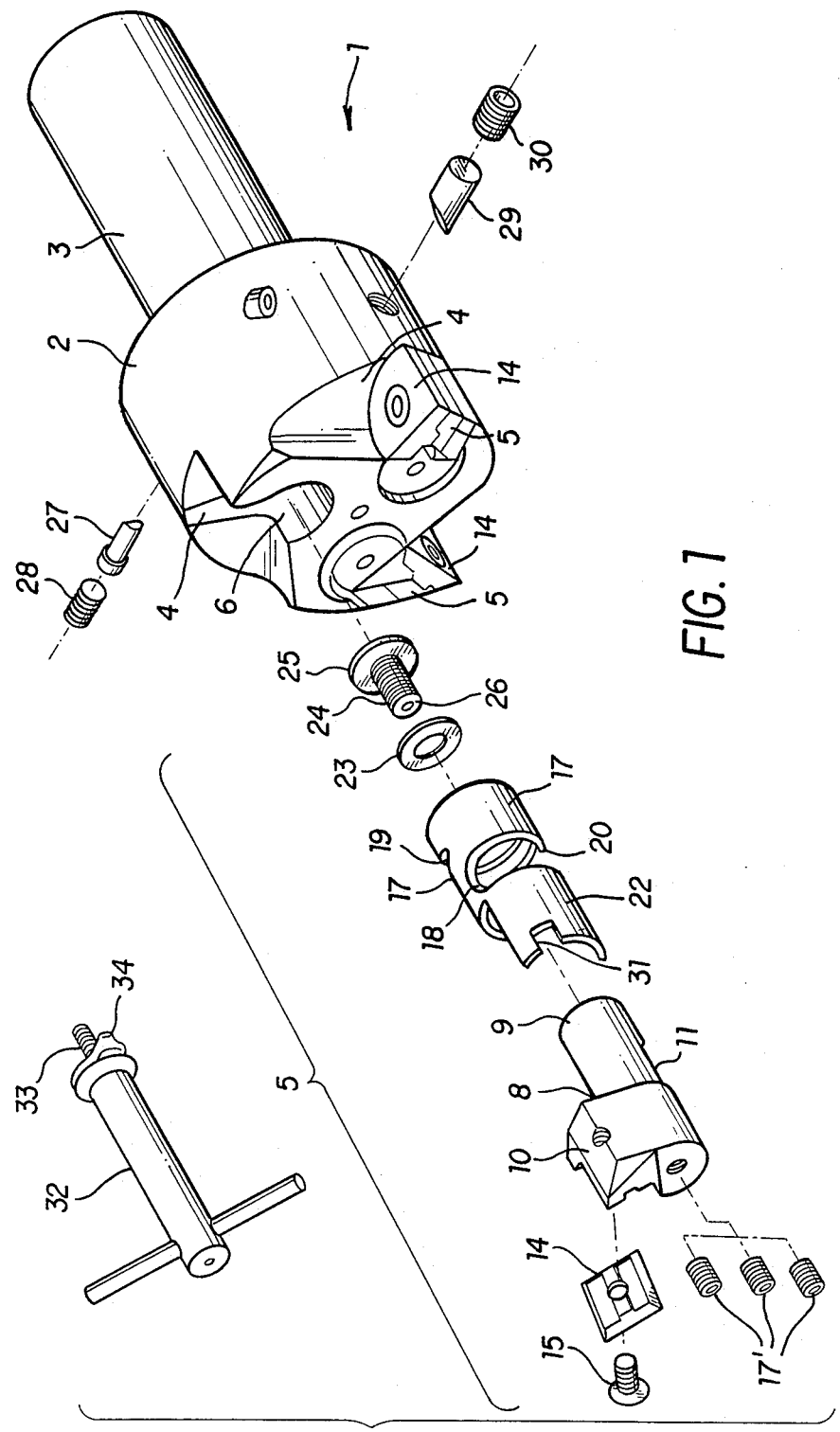

United States Patent [19]

Kieninger

[11] Patent Number: 4,964,763
[45] Date of Patent: Oct. 23, 1990

[54] CUTTER HEAD

[75] Inventor: Walter Kieninger, Lahr, Fed. Rep. of Germany

[73] Assignee: Entwicklungszentrum fur Zerspanungstechnik GmbH & Co. KG, Lahr, Fed. Rep. of Germany

[21] Appl. No.: 298,653

[22] Filed: Jan. 18, 1989

[30] Foreign Application Priority Data

Jan. 19, 1988 [DE] Fed. Rep. of Germany ....... 3801394

[51] Int. Cl.$^5$ ............................................. B26D 1/12
[52] U.S. Cl. ...................................... 407/40; 407/46; 407/101
[58] Field of Search ...................... 407/40, 45, 46, 39, 407/41, 36, 37, 38, 101; 409/234

[56] References Cited

U.S. PATENT DOCUMENTS 3,644,050 2/1972 Schiller ................................. 407/46
4,723,877 2/1988 Erickson .............................. 407/46

Primary Examiner—Frederick R. Schmidt
Assistant Examiner—Lawrence Cruz
Attorney, Agent, or Firm—Nilles & Nilles

[57] ABSTRACT

For machining operations employing cutter heads, use is made of wear-resistant cutting materials, and the cutter heads are operated at constantly increasing cutting speeds and, for coarse machining operations, with high cutting forces. This requires on the one hand a highly reliable mounting of the individual cutter blades or cutter blade carriers, respectively, and on the other hand the possibility of axially and radially adjusting the cutter elements in the micrometer range for the compensation of wear.

The invention provides a cutter head provided with cutter blade carriers (8) having an axial guide stem (9) and a cutter blade mounting portion (10), the guide stem (9) being received in an eccentric bushing (17) acting as a radial adjustment bushing, and coupled therewith for axial adjustment. The eccentric bushing (17) is retained in the main body (2) of the cutter head (1) at an axially fixed position for rotation in the circumferential direction. The cutter blade carrier (8) is locked in the cutter head (1) by means of a radial clamping device.

11 Claims, 4 Drawing Sheets

CUTTER HEAD

The present invention relates to a cutter head having a substantially cylindrical main body formed opposite a machine mounting portion with a plurality of endfacewise and radially accessible cavities for receiving a respective axially and radially adjustable cutter blade carrier each with at least one associated cutter blade. In the field of metal machining, the development of wear-resistant cutting materials has permitted the cutting speed to be progressively increased to thereby reduce the machining time per unit. Cutter heads for the execution of machining operations are equipped with metal carbide blades or cutter blade carriers, respectively, these cutter elements being adjustably mounted in a main body. The axial and/or radial adjustment of the cutter blade carriers has to be carried out with extreme accuracy for ensuring a highly accurate machining result, the wear-resistant properties of the cutter elements or cutter blades requiring an adjustment accuracy in the micrometer range to ensure true running and planar cutting properties of the cutter head. At the same time it has to be ensured that the cutting edges or cutter blade carriers, respectively, are not displaced from their proper position under the influence of the cutting forces during operation of the cutter head, and that the considerable centrifugal forces occurring at high rotational speeds of the tool do not result in irregularities of the tool's dimensions.

At the same time the adjustment of the cutting elements should be possible with high accuracy and in a simple and uncomplicated manner.

In a cutter head known from DE-OS 35 30 745, the axial adjustment of the cutter blade carriers mounted in cavities of the main body of the cutter head is carried out with the aid of a respective differential screw having left- and righthand screw threads. The radial adjustment of the cutter blade carrier requires the latter to be mounted in a cage which is pivotable with the aid of two alternately operable adjustment screws. In practical use this adjustment mechanism does not yet the desirable simplicity and versatility.

It is therefore an object of the invention to provide a cutter head of the type defined in the introduction which permits the cutter elements of the cutter head to be radially and axially adjusted in an uncomplicated manner for insuring dimensional accuracy of the tool while ensuring safe retention of the cutter elements in their positions on the main body of the cutter head during the cutting operation.

According to the invention, this object is attained by the provision that the cutter blade carrier comprises an axial guide stem and a cutter blade mounting portion, said guide stem being received in an eccentric bushing and coupled therewith for axial adjustment, said eccentric bushing being received in said main body in an axially fixed state and rotatable relative to said main body and to said cutter blade carrier, said cutter blade carrier being adapted to be locked in position by means of a radial clamping device.

A preferred embodiment of the invention, permitting continuous radial and axial adjustment of each cutter blade carrier and thus of the respective cutter blade secured thereto, is characterized by the fact that the eccentric bushing has an inner bore eccentrically offset with respect to its outer peripheral surface for receiving therein the guide stem of the cutter blade carrier in a running fit. The eccentric bushing itself is rotatably received in a main bore of the main body in a running fit and is engaged by a fixing pin, the eccentric bushing being further resiliently biased in the axial direction when thus received in the main body of the cutter head.

For the purpose of fixing the eccentric bushing at its axial position in the main body while at the same time permitting it to be rotated for adjustment, the eccentric bushing is formed with a first slot extending in the circumferential direction and adapted to be engaged by a fixing pin extending radially through the main body. For permitting a wedge clamp element to engage the guide stem of the cutter blade carrier for securing it in position within the main body in unison with the eccentric bushing, the latter is formed with a further circumferentially extending slot at an axially and circumferentially offset position, said further slot permitting a wedge pin extending radially through the main body to engage a complementary clamping surface formed on the guide stem of the cutter blade carrier.

For permitting the eccentric bushing to be readily rotated for radial adjustment of the respective cutter blade carrier, the eccentric bushing is formed with an extension preferably extending to a location adjacent the end face of the main body in the assembled state and provided with an engagement groove adapted to be engaged by an adjustment tool used for the rotational adjustment of the eccentric bushing.

For permitting each cutter blade carrier and its associated cutter blade to be readily adjusted in the axial direction the cutter blade carrier is formed with an axial threaded bore having an enlarged interiorly threaded portion at its end opposite the cutter blade mounting portion and adapted to receive therein an adjustment screw, the head of the adjustment screw acting as a counterstop for a cup spring disposed under compression between the screw head and a bottom face of the eccentric bushing for compensating any play occurring between the eccentric bushing and its fixing pin. The screw head is thus supported on the bottom of the main bore of the main body. For permitting the adjustment screw to be actuated in the mounted state of the cutter blade carrier, the end face of its threaded stem is formed with a hexagonal recess adapted to be engaged by a hexagon screwdriver inserted through the threaded axial bore of the cutter blade carrier.

For compensating any possible imbalance, it is preferred to provide threaded pins of different lengths and/or mass which may be threaded from outside into the threaded axial bore of each or any cutter blade carrier.

Figure 2:
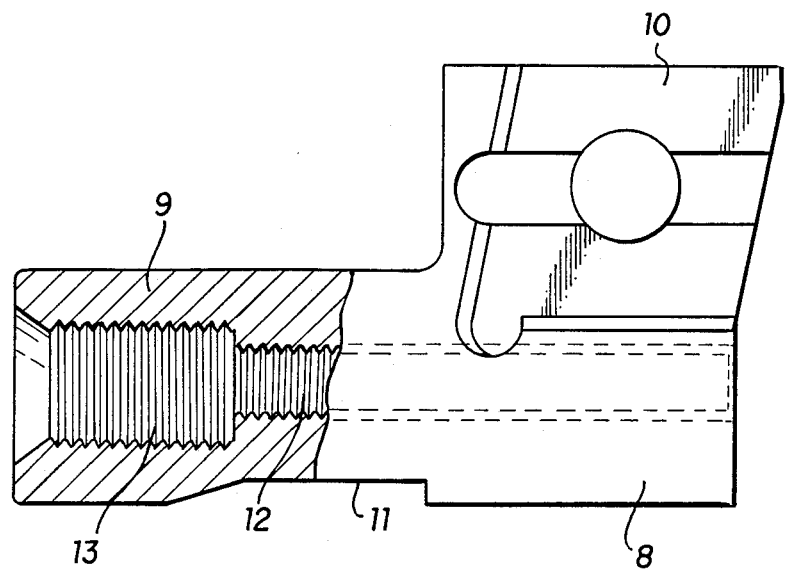
Figure 3:
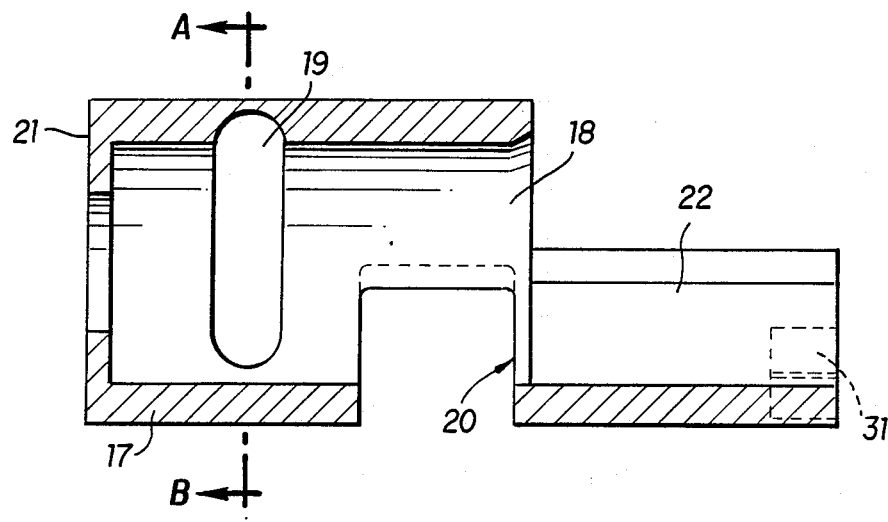
Figure 4:
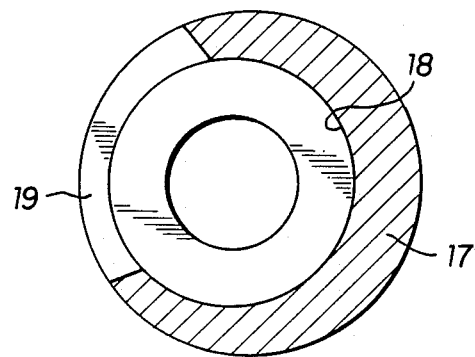
Figure 5:
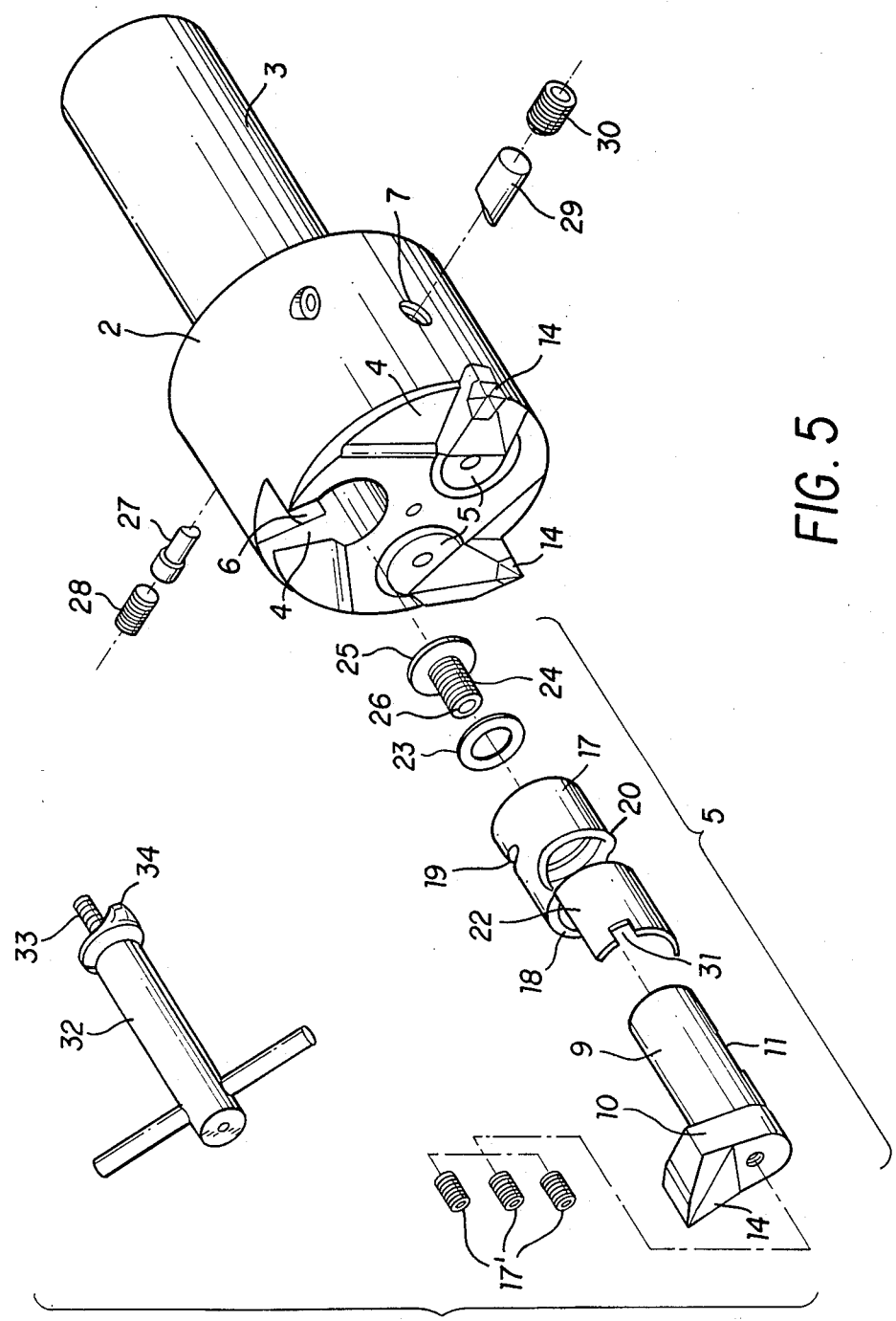

Embodiments of the invention shall now be described by way of example with reference to the accompanying drawings, wherein:

FIG. 1 shows a perspective view of a cutter head with one of it associated cutter assemblies depicted in an exploded view, according to a first embodiment of the invention, FIG. 2 shows an enlarged and partially sectioned view of a cutter blade carrier shown in FIG. 1, FIG. 3 shows an enlarged and longitudinally sectioned view of an eccentric bushing shown in FIG. 1, FIG. 4 shows a sectional view taken along the line A-B of FIG. 3, and FIG. 5 a perspective view similar to FIG. 1 of a cutter head with a cutter assembly according to a second embodiment.

A cutter head 1 shown in FIG. 1 comprises a main body 2 having a circumferential surface, a transverse end face at one end thereof and a machine mounting portion 3 at the other end thereof. The main body 2 is formed with cavities 4 that each opens outwards into the end face and the circumferential surface of the body for receiving a respective cutter assembly 5 therein. To this purpose each cavity 4 includes a main bore 6 extending axially into main body 2 for receiving a respective cutter assembly 5 therein in such a manner that the planar cutting edge of a cutter blade 14 of each cutter assembly 5 is located closely adjacent a front end face plane of main body 2.

For illustrating the construction of each cutter assembly, FIG. 1 shows one cutter assembly 5 in an exploded view, two further cutter assemblies 5 being shown in their mounted state in main body 2 of cutter head 1.

Cutter assembly 5 comprises a cutter blade carrier 8 having a guide stem 9 and a cutter blade mounting portion 10 at one end thereof as shown in detail in FIG. 2. In the first embodiment a cutter blade 14 formed of a metal carbide or a high hardness, nonmetallic material such as polycrystalline diamond (PKD) or cutting ceramics is secured to cutter blade mounting portion 10 by means of a fixing screw 15. A grooved connection between mounting portion 10 and cutter blade 14 is provided for counteracting centrifugal and centripetal forces.

As illustrated in FIG. 8, cutter blade carrier 8 is formed with a threaded axial bore 12 extending centrally through mounting portion 10 and guide stem 9 and having an enlarged internally threaded portion 13 at the end of guide stem 9.

As will be explained in detail as the description proceeds, enlarged internally threaded end portion 13 serves for receiving an adjustment screw 24 for the axial adjustment of cutter blade carrier 8 relative to main body 2. The remainder of threaded bore 12 is provided for giving access to adjustment screw 24 for an adjusting tool and further serves for receiving threaded compensation pins 17' for the compensation of possibly occurring imbalance.

For permitting cutter blade carrier 8 to be radially adjusted relative to main body 2 of cutter head 1, guide stem 9 of cutter blade carrier 8 is received in a running fit in an eccentric bore 18 of an eccentric bushing 17, the latter being secured in position in main body 2 by means of a fixing pin 27. A cup spring 23 for compensating any play between eccentric bushing 17 and fixing pin 27 is held under compression between an end face 21 of eccentric bushing 17 and a head 25 of adjustment screw 24 threaded into internally threaded portion 13 of guide stem 9. In the completely mounted position head 25 of screw 24 is supported on the bottom of main bore 6.

The eccentric bushing acting as a radial adjustment bushing is shown in detail in FIGS. 3 and 4.

As shown in FIGS. 1, 3 and 4, eccentric bushing 17 has an axial bore 18 eccentrically offset relative to its outer peripheral surface, with a coaxial passage 8a in an end face 21 of eccentric bushing 17. Bushing 17 further has an axial extension 22 formed with an engagement groove 31 in its end face. Eccentric bushing 17 finally has circumferentially extending slots 19, 20 formed therein at axially and circumferentially offset positions.

Slot 19 serves for fixing eccentric bushing 17 at its axial position in main body 2 of cutter head 1 by means of a fixing pin 27 extending radially through main body 2 and secured by a threaded pin 28. For compensating any play between eccentric bushing 17 and fixing pin 27, cup spring 23 acts to bias bushing 17 in the axial direction. Eccentric bushing 17 is received in a running fit in the main bore 6 of main body 2 opening into the associated cavity 4.

Slot 20 is provided for permitting a wedge pin 29 to come into direct contact with a clamping surface 11 of guide stem 9 after cutter assembly 5 has been inserted into main body 2. To this purpose wedge pin 29 is inserted into a clamping bore 7 of main body 2 intersecting the respective main bore 6, and secured therein by means of a threaded pin 30.

For reliably fixing cutter blade carrier 8 with cutting blade 14 thereon in position in main body 2 of cutter head clamping surface 11 on guide stem 9 is formed and engaged by wedge pin 29 in a manner permitting cutter assembly 5 as a whole to be secured in main body 2 by 0 clamping cutter blade carrier 8 together with eccentric bushing 17 in a generally radially outward direction in the respective main bore 6 of main body 2. In this manner it is ensured that centrifugal forces caused by the rotation of cutter head 1 act to engage cutter assembly 5 even more firmly with main body 2 in the clamping direction, and that dynamic loads acting on cutter head 1 will not result in any displacement of cutter blades 14 after these have been adjusted with an accuracy within the micrometer range. FIG. 5 shows an exploded perspective view of a cutter assembly 5 according to a second embodiment of the invention. This embodiment differs from the one shown in FIG. 1 by the use of a cutter blade carrier 8 having a cutter blade 14 of a metal carbide or another cutting material soldered or brazed to its cutter blade mounting portion 10. Cutter blade 14 is thus integrally connected to cutter blade carrier 8, thus permitting the adjustment accuracy of cutter head 1 to be further improved. Otherwise cutter assembly 5 with its associated fixing and adjustment components completely corresponds to the embodiment shown in FIG. 1, similar parts being identified by the same reference numerals. With respect to details of construction and assembly, reference is made to the preceding explanations.

The mounting, adjustment and securing in position of one of cutter assemblies 5 of cutter head 1 shall now be explained in detail, it being understood that the described procedure applies to each cutter assembly 5.

Preparatory to mounting cutter assembly 5 in main body 2 of cutter head 1 and to its high-accuracy adjustment in the axial and radial directions, guide stem 9 of cutter blade carrier 8 carrying cutter blade 14 thereon is inserted into axial bore 18 of eccentric bushing 17 and secured therein by threading adjustment screw 24 into internally threaded end portion 13 of guide stem 9 with the interposition of cup spring 23 between adjustment screw head 25 and end face 21 of eccentric bushing 17. The thus pre-assembled cutter assembly 5 forms a unit adapted to be inserted into a respective cavity and associated main bore 6 of main body 2. Adjustment screw 24 is threaded into internally threaded end portion 13 at least to a depth ensuring the biasing force cf cup spring 23 to become effective between adjustment screw head 25 and eccentric bushing 17 while preferably permitting eccentric bushing 17 to retain a certain degree of axial mobility towards adjustment screw head 25. With respect to the radial bore (not shown in detail) for receiving fixing pin 27, the depth of main bore 6 associated to cavity 4 of main body 2 is selected so that, when the pre-assembled cutter assembly 5 is inserted thereinto under compression of cup spring 23, slot 19 of eccentric bushing 17 comes into alignment with the radial bore, permitting fixing pin 27 to be inserted into main body 2 for engagement with slot 19 to thereby retain eccentric bushing 17 at a predetermined axial position relative to main body 2 in cooperation with the axial biasing force of cup spring 23, fixing pin 27 being subsequently secured in position by means of threaded pin 28. In this manner cutter assembly 5 as a whole is retained in main body 2.

The axial position of cutter blade carrier 8 and thus of cutter blade 14 may now be adjusted by inserting a hexagon screwdriver through threaded axial bore 12 of cutter blade carrier 8 and into hexagonal recess 26 of adjustment screw 24 for rotating the latter rightwards or leftwards to thereby adjust the axial position of cutter blade carrier 8 relative to eccentric bushing 17 and thus relative to the end face of main body 2. The axial adjustment range is determined by the effective biasing range of cup spring 23. Since due to the wear-resistance of the employed cutting materials the axial adjustment range of the cutter assembly is substantially restricted to the micrometer range, the thus defined adjustment range is found to be fully sufficient.

For adjusting the effective diameter of cutter head 1, cutter blade carrier 8 may then be radially adjusted by rotating eccentric bushing 17 relative thereto. This purpose is served by a special tool 32 (cf. FIGS. 1 and 5) provided with a non-threaded guide pin 33 for insertion into threaded bore 12 and an engagement lug 34 for engagement with engagement groove 31 of eccentric bushing 17. Due to the eccentric mounting of cutter blade carrier 8 in bushing 17, rotation of the latter results in a radial displacement of cutter blade carrier 8 and the associated cutter blade relative to main body 2 of cutter head 1. Due to the circumferential length of slots 19, 20, the rotation of eccentric bushing 17 is not hampered by the engagement thereof with fixing pin 27 and wedge pin 29, the latter having previously been inserted preparatory to clamping guide stem 9 of cutter blade carrier 8. After the radial adjustment has thus been accomplished, threaded pin 30 is tightened down onto wedge pin 29 in clamping bore 7 of main body 2, to thereby engage wedge pin 29 with clamping surface 11 for fixedly clamping cutter blade carrier 8 and thus cutter assembly 5 as a whole in the respective main bore 6 of main body 2. This clamping action is devised to result in a clamping force acting radially outwards in main body 2 to thereby eliminate any dynamic influence at the high rotational speeds of the cutter head required for the desirable high cutting speeds in the machining operation.

The cutter blades 14 of the remaining cutter assemblies 5 are adjusted in a similar manner, the cutter head 1 of the embodiments shown being equipped with three cutter assemblies 5 at 120° spacings.

In this manner the invention permits each cutter blade carrier 8 of cutter head 1 to be individually adjusted in a simple and highly accurate manner for an uncomplicated re-adjustment of the respective cutter blades 14 or cutting edges thereof for wear compensation. For reasons of simplification the arrangement of the threaded pins 28, 30 associated to the cutter assemblies 5 depicted in the mounted state is not shown in the drawings.

The axial retention of eccentric bushing 17 by means of the repective fixing pin 27 also permits the associated cutter blade carrier 8 to be dismounted from main body 2, with the associated eccentric bushing 17, cup spring 23 and adjustment screw 24 remaining in the respective main bore 6 in abutment of adjustment screw 24 with the bottom of the respective bore 6. This permits each cutter blade carrier 8 to be quickly and readily exchanged when so required. Any unbalance of cutter head 1 may be compensated by threading compensating screws 17' of different lengths and/or different density materials into threaded axial bore 8 of each or any cutter blade carrier 8, with the additional effect of closing the respective threaded bore 12.

The initial mounting of cutter assemblies 5 in main body 2 of cutter head 1 may also be carried out by successively inserting adjustment screw 24, cup spring 2-: and eccentric bushing 17 into the respective main bore 6 and axially securing eccentric bushing 17 in position by means of fixing pin 27 and threaded pin 28 under axial compression of cup spring 23, followed by the insertion of cutter blade carrier 8 and its engagement with adjustment screw 24 by rotating the latter by engagement of its hexagonal recess 26 to thereby simultaneously achieve the axial adjustment of the respective cutter blade carrier.

The invention is of course not restricted to the embodiments shown and described by way of example, and may rather encompass structural modifications particularly of the cutter blade carrier 8 and its cutter blade mounting portion 10 and/or of the fixing and clamping components 27, 28, 29, 30, which may also be combined to form a unitary functional element.

I claim:

1. In a cutter head of the type that includes a substantially cylindrical axially extending main body having spaced apart ends and a circumferential surface, one of said ends having an end face, the other of said ends having a machine mounting portion, said main body portion having a plurality of cavities each of which opens outwards onto both said end face and said circumferential surface, and a cutter blade carrier mounted for axial and radial adjustment in each of said cavities for holding at least one associated cutter blade;

the improvement comprising:
said cutter blade carrier (8) having an axial guide stem (9) and a cutter blade mounting portion (10),
an eccentric bushing (17) mounted in said main body in an axially fixed position;
said cutter blade carrier guide stem being mounted in said eccentric bushing and coupled therewith for axial adjustment;
said eccentric bushing being rotatable relative to said main body and to said cutter blade carrier; and
a clamping device (29, 30) for locking said cutter blade carrier in position.

2. A cutter head according to claim 1, wherein
said eccentric bushing (17) has an outer peripheral surface and an inner bore (18) eccentrically offset with respect to said outer peripheral surface for receiving therein said guide stem (9) of said cutter blade (8) in a sliding fit;
said main body has a main bore (6), said eccentric bushing (17) being received in a sliding fit in said main bore (6); and
biasing means (23) are provided for resilient biasing said eccentric bushing in said main body (2) in an axial direction.

3. A cutter head according to claim 2, wherein said eccentric bushing (17) has slots (19, 20) at axially and circumferentially offset positions.

4. A cutter head according to claim 3, wherein said eccentric bushing (17) has an extension (22) having an end face, and wherein an engagement groove (31) is formed in said end face.

5. A cutter head according to claim 1, wherein said eccentric bushing has an end face (21), said cutter blade carrier (8) includes an end opposite said cutter blade mounting portion (10) having an axially threaded bore (12) including an enlarged interiorly threaded portion (13), an axial adjustment screw (24) in said threaded bore, and a cup spring (23) interposed between said bushing end face and said adjusting screw.

6. A cutter head according to claim 5, wherein said adjustment screw (24) has a threaded stem terminating in an end face having a hexagonal recess (26) therein.

7. A cutter head according to claim 3, wherein said eccentric bushing (17) is mounted in said main body (2) in an axially biased state by means of a fixing pin (27) extending radially through said main body (2) into engagement with one (19) of said slots of said eccentric bushing (17).

8. A cutter head according to claim 1, wherein said guide stem (9) of said cutter blade carrier (8) has a clamping surface (11), and wherein a wedge pin (29) extends radially through said main body and into engagement with said clamping surface for locking said cutter blade carrier (8) and said eccentric bushing (17) in said main body (2) by clamping said cutter blade carrier (8) against said main body (2).

9. A cutter head according to claim 1, wherein said cutter blade (14) and said cutter blade mounting portion (10) of said cutter blade carrier (8) have interfitting groove and rib portions to counteract centrifugal forces, said cutter blade being secured to said cutter blade mounting portion (10) by a fixing screw (15).

10. A cutter head according to claim 1, wherein said cutter blade is a metal carbide blade or a polycrystalline diamond blade soldered to said cutter blade mounting portion (10).

11. A cutter blade according to claim 1, wherein said cutter blade carrier (8) has means for receiving imbalance compensating screws (17') of different mass therein.

* * * * *